(12) United States Patent
Ueda

(10) Patent No.: US 7,690,458 B2
(45) Date of Patent: Apr. 6, 2010

(54) CONTROL APPARATUS AND CONTROL METHOD FOR VEHICLE-MOUNTED FUEL CELL POWER GENERATION SYSTEM

(75) Inventor: Akihiro Ueda, Toyota (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 1056 days.

(21) Appl. No.: 10/557,576

(22) PCT Filed: May 14, 2004

(86) PCT No.: PCT/IB2004/001556

§ 371 (c)(1),
(2), (4) Date: Mar. 16, 2006

(87) PCT Pub. No.: WO2004/103763

PCT Pub. Date: Dec. 2, 2004

(65) Prior Publication Data

US 2007/0023215 A1    Feb. 1, 2007

(30) Foreign Application Priority Data

May 22, 2003   (JP)   ............................. 2003-144754

(51) Int. Cl.
*B60W 10/28* (2006.01)

(52) U.S. Cl. .................... 180/65.31; 180/271; 903/908; 903/944; 429/12

(58) Field of Classification Search ................. 180/271, 180/65.1, 65.31, 65.8; 903/908, 944; 701/22, 701/29, 45, 301; 429/12, 17
See application file for complete search history.

(56) References Cited

U.S. PATENT DOCUMENTS 5,816,358 A   10/1998  Adler et al.

(Continued)

FOREIGN PATENT DOCUMENTS

DE        43 23 604 A1     1/1995

(Continued)

OTHER PUBLICATIONS

German Language Version of German Office Action, Appn. No. 11 2004 000 890.5 issued on Mar. 23, 2007.

(Continued)

*Primary Examiner*—S. Joseph Morano
*Assistant Examiner*—John D Walters
(74) *Attorney, Agent, or Firm*—Kenyon & Kenyon LLP

(57) ABSTRACT

A control apparatus for a vehicle-mounted fuel cell power generation system in accordance with the invention predicts a possibility of collision of a vehicle. If determining that the possibility of collision is high (YES at S12), the control apparatus stops the fuel cell power generation system. By stopping the power generation before a collision occurs, the safety of the fuel cell power generation system can be improved. If after the system stops, a collision does not occur (NO at S16), the system is restarted. If a collision occurs (YES at S16), high-voltage relays are switched off to stop the supply of electric power from an electricity storage to various loads of the vehicle.

47 Claims, 2 Drawing Sheets

U.S. PATENT DOCUMENTS

| | | | |
|---|---|---|---|
| 6,395,414 B1 * | 5/2002 | Clingerman et al. | 429/17 |
| 6,536,551 B1 * | 3/2003 | Tanaka et al. | 180/271 |
| 6,591,924 B2 * | 7/2003 | Shimizu | 180/65.1 |
| 6,640,174 B2 * | 10/2003 | Schondorf et al. | 701/45 |
| 6,645,650 B2 * | 11/2003 | Meyer et al. | 429/13 |
| 6,917,305 B2 * | 7/2005 | King | 340/903 |
| 2003/0076981 A1 * | 4/2003 | Smith et al. | 382/104 |

FOREIGN PATENT DOCUMENTS

| | | |
|---|---|---|
| DE | 196 30 842 C1 | 11/1997 |
| DE | 199 50 008 A1 | 4/2001 |
| DE | 100 52 174 A1 | 5/2001 |
| EP | 1 164 048 A2 | 12/2001 |
| JP | 06-046502 A | 2/1994 |
| JP | 11-026003 A | 1/1999 |
| JP | 2000-092605 A | 3/2000 |
| JP | 2001-119815 A | 4/2001 |
| JP | 2001-189161 A | 7/2001 |
| JP | 2001-357863 A | 12/2001 |
| JP | 2002-289235 A | 10/2002 |
| JP | 2003-077506 A | 3/2003 |
| JP | 2003-077606 A | 3/2003 |
| JP | 2003-092126 A | 3/2003 |
| WO | WO 01/48847 A2 | 7/2001 |

OTHER PUBLICATIONS

English Translation of German Office Action, Appn. No. 11 2004 000 890.5 issued on Mar. 23, 2007.

* cited by examiner

CONTROL APPARATUS AND CONTROL METHOD FOR VEHICLE-MOUNTED FUEL CELL POWER GENERATION SYSTEM

This is a 371 national phase application of PCT/IB2004/001556 filed 14 May 2004, claiming priority to Japanese Patent Application No. 2003-144754 filed 22 May 2003, the contents of which are incorporated herein by reference.

FIELD OF THE INVENTION

The invention relates to a technology for controlling a vehicle-mounted fuel cell power generation system and, more particularly, to a control technology for a vehicle-mounted fuel cell power generation system in which safety is taken into consideration.

BACKGROUND OF THE INVENTION

In conjunction with a fuel cell-equipped vehicle, a technology for stopping the supply of a fuel gas and breaking an electrical connection if detecting a collision of the vehicle is known (e.g., see Japanese Patent Application Laid-Open Publication No. JP-A-2001-357863). Furthermore, in conjunction with an electric vehicle, a technology for shutting off a vehicle-driving electric power source without shutting off a control electric power source provided for electrical components, such as headlights and the like, if determining that it is impossible to avoid a collision is known (e.g., Japanese Patent Application Laid-Open Publication No JP-A-6-46502).

However, considering various fashions of collisions, the technology of Japanese Patent Application Laid-Open Publication No. JP-A-2001-357863, which performs actions after detecting a collision, needs contrivances in the vehicle body structure and the like for preventing degradation or breakage of the fuel cell, and therefore has a problem of increased cost and weight. Furthermore, although Japanese Patent Application Laid-Open Publication No. JP-A-6-46502 discloses a technology that predicts a collision of an electric vehicle and shuts off a vehicle-driving electric power source, the fuel-cell vehicles need to meet high-pressure gas handling standards in addition to the safety standards of electric vehicles.

From document EP 1 164 048 A2 are a method and apparatus for cutting off fuel supply of a fuel cell vehicle known, wherein the occurrence of degradation and damage to a fuel cell when power supply to accessories for driving the fuel cell is stopped, is prevented. Respective collision judgement sections read in an acceleration signal output from corresponding acceleration sensors and judge if the acceleration signal is greater than a predetermined first threshold acceleration, and if the judgement result is "YES", close a hydrogen control valve. They then judge if the acceleration signal exceeds a predetermined second threshold acceleration greater than the first threshold acceleration, and if the judgement result is "YES", stop power supply from a power storage unit to an air compressor for driving the fuel cell.

Another method for operating a pre-crash sensing system in a vehicle having a counter-measure system is known from US 2003/0076981 A1. The pre-crash system has a controller coupled to an object sensor. The object sensor has a vision system that includes image sensors to detect an impact in particular, a side impact. The image sensors provide a high frame rate to a video-processing chip which in turn is coupled to a general purpose controller. The general purpose controller determines whether an object is an impending threat and controls the deployment of an airbag through an airbag controller or other counter-measure. The high frame rate used in this pre-crash system allows not only a distance to the object but the velocity of the object is as well as the acceleration of the object to be determined and factored into the deployment decision.

Further, document WO 01/48847A discloses a fuel cell unit and a method for operating said unit, wherein a fuel cell unit that can be used in mobile objects, comprises an emergency stop. The device which is provided to execute an emergency stop cuts off the hydrogen supply and also initiates other measures as required, including decoupling and/or deactivation of the electricity and/or voltage transport devices.

A safety apparatus for a fuel cell vehicle is also known from JP 2001-189161 A. This apparatus comprises a fuel reformer, a sensor for detecting impact generated in an accident of a car, abnormal signal generating means for generating abnormal signals based on the output value of the sensor, valves for stopping the supplier of the fuel gas and oxidant gas based on the abnormal signal as a reformer-induction gas-stop means, an inert gas cylinder, cutoff valves being installed at front and rear of the reformer to fill the inert gas, and a value for introducing the inert gas based on the abnormal signal.

Further, document U.S. Pat. No. 5,816,358 discloses an electric vehicle with circuit breakers, wherein the electrically powered vehicle includes an electric motor connected to drive a wheel of the vehicle. The electric motor receives a supply of electric current from a power source; a power electronics device and superordinated controller regulate the current supply based upon signals received from a driver or operator of the vehicle. A sensor for sensing data indicative of an accident or impending accident is connected to the superordinated controller in which the sensor data is compared to predetermined limit values to determine if an accident situation exists. Upon determining that an accident situation exists, the superordinated controller activates a circuit breaker to disconnect the electric power supply and thereby interrupt the supply of electric current to the electric motor.

SUMMARY OF THE INVENTION

It is an object of the invention to provide a control technology capable of safely operating a vehicle-mounted fuel cell power generation system.

A first aspect of the invention relates to a control apparatus for a vehicle-mounted fuel cell power generation system. The control of this aspect includes: prediction means for predicting a possibility of collision of a vehicle; and stop means for stopping the vehicle-mounted fuel cell power generation system, wherein the stop means stops the vehicle-mounted fuel cell power generation system if the prediction means determines that the possibility of collision is high.

According to this control apparatus, the vehicle-mounted fuel cell power generation system can be stopped before a crash, so that an accident that can result from the use of combustible hydrogen is precluded. Thus, highly safe operation of a vehicle-mounted fuel cell power generation system can be realized.

If the prediction means determines that the possibility of collision is high, the stop means may discontinue supply of a gas to a fuel cell. Therefore, as the supply of hydrogen, having a time delay, is cut off in a stage prior to a collision, it becomes possible to stop the power generation of the fuel cell prior to occurrence of the collision.

If the prediction means determines that the possibility of collision is high, the stop means may purge a gas supplying passage of a fuel cell. Despite the stop of supply of hydrogen from the hydrogen source, there is a possibility that hydrogen remaining in a hydrogen supplying passage will be supplied to the fuel cell. Therefore, by releasing hydrogen from the hydrogen supplying passage into the atmosphere, the power generation of the fuel cell can be quickly stopped, and an accident that may result from the hydrogen remaining between the hydrogen source and the fuel cell can be avoided.

If the prediction means determines that the possibility of collision is high, the stop means may electrically disconnect a fuel cell from another electrical system. The electrical disconnection of the fuel cell from other electrical systems will stop the power generation of the fuel cell.

The control apparatus of the first aspect may further include: electricity storage means for storing an electric power generated by a fuel cell; a load that consumes an electric power; disconnection means for electrically disconnecting the load and the electricity storage means form each other; and detection means for detecting a collision of the vehicle, wherein if the detection means detects a collision of the vehicle, the disconnection means electrically disconnects the load and the electricity storage means from each other. As the electrical connection between the load and the electricity storage means is maintained until detection of a collision of the vehicle, it is possible to activate the load and guarantee a failsafe operation based on electric power from the electricity storage means even after the vehicle-mounted fuel cell power generation system is stopped.

The control apparatus of the first aspect of the invention may further include start means for starting the vehicle-mounted fuel cell power generation system, wherein if the prediction means determines that the possibility of collision is high and then, within a predetermined time that follows, the detection means does not detect a collision, the start means restarts the vehicle-mounted fuel cell power generation system. Therefore, after the vehicle-mounted fuel cell power generation system is stopped on the basis of a determination that the possibility of a collision is high, operation of the vehicle-mounted fuel cell power generation system can be resumed if the collision is avoided.

The prediction means may use an acceleration sensor. The acceleration sensor may be a sensor that is also used for other purposes. Furthermore, the prediction means may use a distance measuring sensor.

A second aspect of the invention relates to a control apparatus for a vehicle-mounted fuel cell power generation system. This control apparatus includes: determination means for determining whether a vehicle will collide with an external object; and stop means for stopping the vehicle-mounted fuel cell power generation system, wherein the stop means stops the vehicle-mounted fuel cell power generation system if the determination means determines that the vehicle will collide with the external object.

In the first and second aspects, the vehicle-mounted fuel cell power generation system may include a hydrogen source that supplies hydrogen to a fuel cell of the vehicle-mounted fuel cell power generation system. The hydrogen source may include a reformer that generates hydrogen.

A third aspect of the invention relates to a control method for a vehicle-mounted fuel cell power generation system. In this control method, it is determined whether a possibility of collision of a vehicle is high, and if it is determined that the possibility of collision of the vehicle is high, the vehicle-mounted fuel cell power generation system is stopped.

If it is determined that the possibility of collision of the vehicle is high, supply of hydrogen from a hydrogen source to a fuel cell may be stopped, and hydrogen may be released from a hydrogen supplying passage of the fuel cell to outside. Therefore, the possibility of an accident being caused by hydrogen at the time of collision can be reduced.

A fourth aspect of the invention relates to a control method for a vehicle-mounted fuel cell power generation system. In this control method, it is determined whether the vehicle will collide with an external object, and if it is determined that the vehicle will collide with the external object, the vehicle-mounted fuel cell power generation system is stopped.

A fifth aspect of the invention relates to a control apparatus for a vehicle-mounted fuel cell power generation system. This control apparatus includes a first controller that predicts a possibility of collision of a vehicle; and a second controller that stops the vehicle-mounted fuel cell power generation system if the first controller determines that the possibility of collision is high.

A sixth aspect of the invention relates to a control apparatus for a vehicle-mounted fuel cell power generation system. This control apparatus includes a first controller that determines whether a vehicle will collide with an external object; and a second controller that stops the vehicle-mounted fuel cell power generation system if the first controller determines that the vehicle will collide with the external object.

A seventh aspect of the invention relates to a control apparatus for a vehicle including a fuel cell. The control apparatus includes a first controller that predicts a possibility of collision of the vehicle; and a second controller that outputs the predicted possibility to a control apparatus for the fuel cell.

An eighth aspect of the invention relates to a control apparatus for a vehicle including a fuel cell. The control apparatus includes a first controller that determines whether the vehicle will collide with an external object; and a second controller that outputs information regarding a collision to a control apparatus for the fuel cell if the first controller determines that the vehicle will collide with the external object.

In the fifth, sixth, seventh and eighth aspects of the invention, one electronic control unit (ECU) may function as both the first and second controllers, or a plurality of ECU may function as both the first and second controllers.

BRIEF DESCRIPTION OF THE DRAWINGS

The foregoing and further objects, features and advantages of the invention will become apparent from the following description of preferred embodiments with reference to the accompanying drawings, wherein like numerals are used to represent like elements and wherein.

DETAILED DESCRIPTION OF PREFERRED EMBODIMENTS

Figure 1:
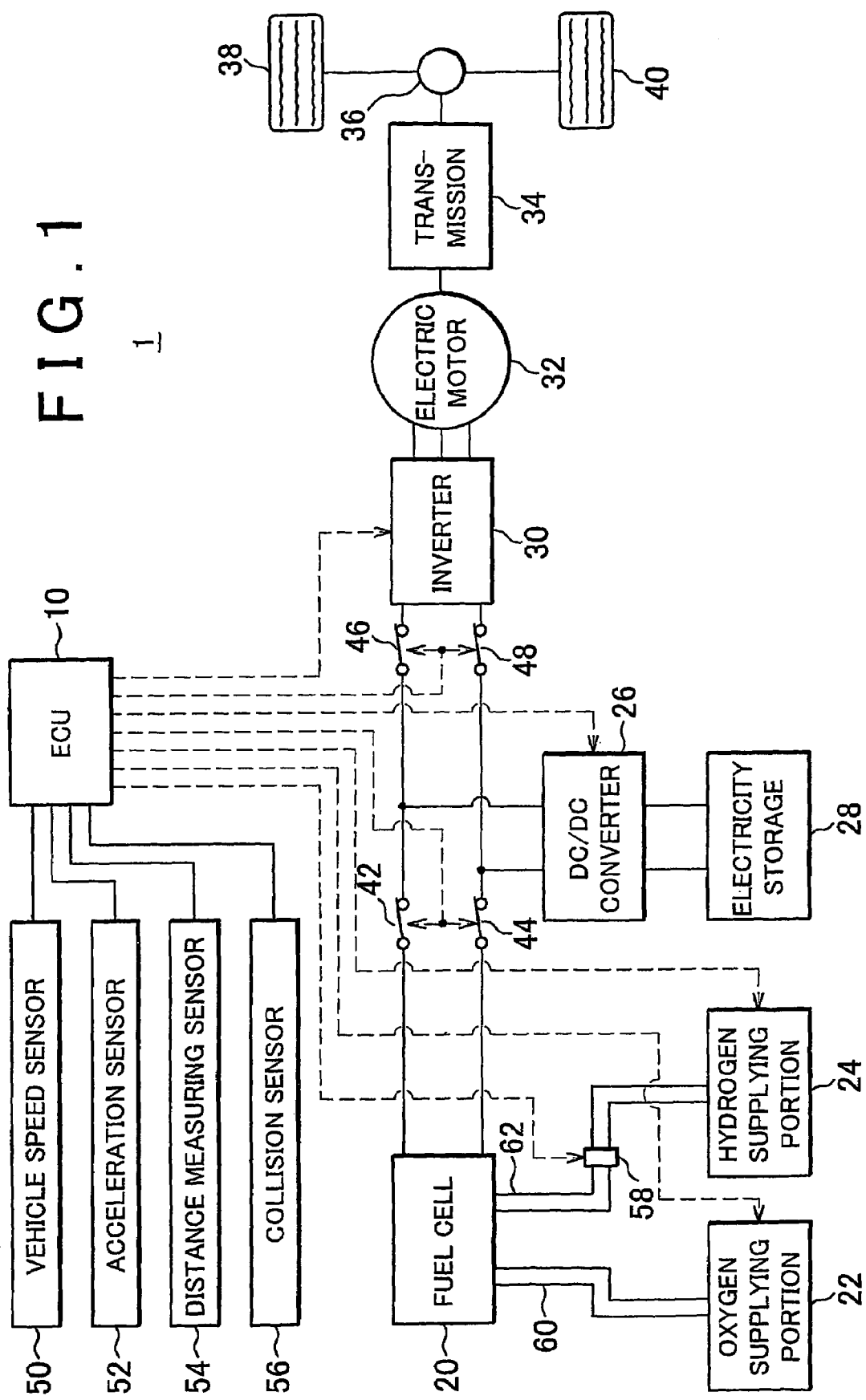
FIG. 1 is a diagram illustrating a construction of a vehicle equipped with a fuel cell power generation system in accordance with an embodiment of the invention.

FIG. 1 illustrates a construction of a vehicle equipped with a fuel cell power generation system in accordance with an embodiment of the invention. The fuel cell power generation system forms a drive power source of a vehicle 1. The fuel cell power generation system is controlled by an electronic control unit (hereinafter, referred to as "ECU"). The ECU 10 may exist as a single-component unit as indicated in FIG. 1, but may also exist as a combination of subsidiary ECUs specialized for operation controls of a fuel cell (FC) battery 20, an electric motor 32 and the like, and a main ECU that controls and manages the subsidiary ECUs. In the description below, the arrangement for realizing control functions will be expressed as ECU 10. The ECU 10 has a CPU, a RAM, and a ROM. In this embodiment, the ECU 10 controls the fuel cell power generation system, and cooperates with other arrangements to function as a control apparatus for the vehicle-mounted fuel cell power generation system.

The fuel cell 20 generates electric power through an electrochemical reaction between oxygen contained in the air and hydrogen supplied from a hydrogen tank or produced through a reforming reaction, and supplies electric power to an inverter 30 while the vehicle is running. The fuel cell 20 has a stack structure in which a plurality of unit cells are stacked; in terms of electrical construction, many unit cells are disposed in series connection. For example, in the case of a polymer electrolyte fuel cell type, each unit cell has, as an electrolyte membrane, a polymer membrane with high hydrogen ion conductivity, and further has a hydrogen electrode and an oxygen electrode that sandwich the polymer membrane from the opposite sides. The fuel cell 20 may also be of other types, for example, a phosphoric acid fuel cell type, a molten carbonate fuel cell type, etc. An oxygen supplying portion 22 supplies oxygen-containing air to the fuel cell 20 via a piping 60, through the use of an air blower. A hydrogen supplying portion 24 may generate a hydrogen gas from methanol or gasoline using a reformer. As for the hydrogen supplying portion 24, it is also possible to store hydrogen in a hydrogen absorbing alloy or a high-pressure vessel. The hydrogen supplying portion 24 supplies hydrogen generated or hydrogen from a storage to the fuel cell 20 via a piping 62. The piping 62 for supplying hydrogen is provided with an electromagnetic valve 58 for releasing hydrogen. In this embodiment, the fuel cell 20, the oxygen supplying portion 22 and the hydrogen supplying portion 24, together with a piping system and an electrical system around these components, form a vehicle-mounted fuel cell power generation system. The ECU 10 controls the oxygen supplying portion 22 and the hydrogen supplying portion 24 so as to determine the amounts of oxygen and hydrogen supplied.

An electricity storage 28 is a capacitor or a secondary battery such as a nickel metal hydride battery or the like. The amount of charge and discharge of the electricity storage 28 is monitored by the ECU 10, and is managed by the ECU 10 controlling a DC/DC converter 26. The DC/DC converter 26 is a direct-current voltage transformer, and has a function of adjusting the DC voltage from the electricity storage 28 and outputting the adjusted voltage to the inverter 30, and a function of adjusting the DC voltage from the fuel cell 20 or the electric motor 32 and storing it into the electricity storage 28. The electric motor 32 becomes a load that consumes electric power during the running of the vehicle, but functions as a generator during braking. While the vehicle is running, the electricity storage 28 cooperates with the fuel cell 20 to supply power to the inverter 30.

The ECU 10 generates three-phase alternating currents corresponding to a requested power by controlling the switching of the inverter 30, and supplies the three-phase alternating currents to the electric motor 32. The output from the electric motor 32 is transferred to driving wheels 38, 40 via a transmission 34 and a differential gear 36. The transmission 34 may be omitted.

The ECU 10 sets a power that can be generated by the fuel cell 20, from the amounts of hydrogen and oxygen supplied to the fuel cell 20. This generatable electric power is termed permitted electric power. In accordance with the relationship between the permitted electric power and a requested electric power that is requested for the electric motor 32, the ECU 10 achieves the sharing of the electric power to be supplied to the electric motor 32 between the fuel cell 20 and the electricity storage 28.

During the running of the vehicle, a vehicle speed sensor 50 detects the speed of the vehicle 1, and an acceleration sensor 52 detects the acceleration of the vehicle 1. For example, an acceleration sensor for an ABS (antilock brake system) installed in the vehicle 1 may be utilized as an acceleration sensor 52. A distance measuring sensor 54 detects an obstacle, and measures a distance to the obstacle. The distance measuring sensor 54 is provided in the vehicle 1 so as to detect an obstacle forward of the vehicle 1, and measures the distance to the nearest obstacle among the obstacles existing forward of the vehicle in the traveling direction. A collision sensor 56 detects a collision of the vehicle 1. The collision sensor 56 may be, for example, an acceleration sensor provided for an airbag. The vehicle speed detected by the vehicle speed sensor 50, the acceleration detected by the acceleration sensor 52, the distance measured by the distance measuring sensor 54, and data regarding occurrence of a collision detected by the collision sensor 56 are transferred to the ECU 10. The ECU 10 may also perform an ABS control, and may activate an airbag.

The fuel cell 20 and the DC/DC converter 26 are interconnected by FC relays 42, 44, and the DC/DC converter 26 and the inverter 30 are interconnected by high-voltage relays 46, 48. The ECU 10 controls the switching of the FC relays 42, 44 and the high-voltage relays 46, 48. During the normal running of the vehicle, each of the FC relays 42, 44 and the high-voltage relays 46, 48 is controlled to a closed state.

In this embodiment, the ECU 10 predicts a possibility of collision of the vehicle 1. If determining that the possibility of collision is high, the ECU 10 stops the fuel cell power generation system. A situation of high possibility of collision means a situation where it is impossible or very difficult to avoid a collision. By stopping the fuel cell power generation system before the vehicle 1 collides, it becomes possible to avoid or preclude an accident that can result from the use of hydrogen, which is combustible. Unlike a vehicle equipped with an internal combustion engine or an electric vehicle, the fuel cell power generation system-equipped vehicle 1 requires the very careful handling of hydrogen. According to the control apparatus for the fuel cell power generation system in the embodiment, the fuel cell power generation system is stopped on the basis of generally-termed pre-crash judgment (i.e., stopped on the basis of a result of prediction of the possibility of collision which is performed before the vehicle collides). Therefore, safety of the vehicle can be secured in comparison with the case where the fuel cell power generation system is stopped after vehicle collides.

Figure 2:
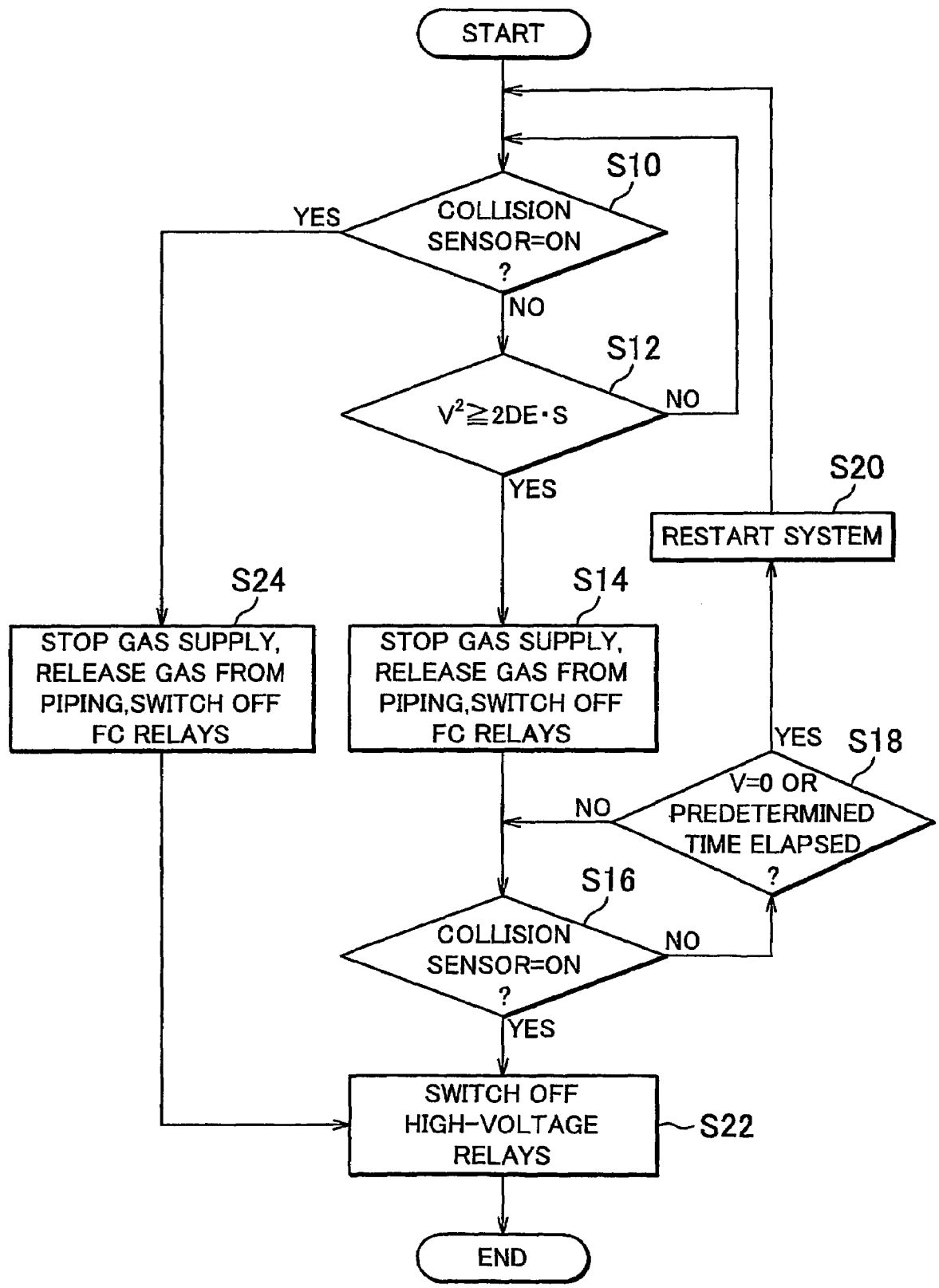
FIG. 2 is a flowchart of a control of a vehicle-mounted fuel cell power generation system in accordance with an embodiment of the invention.

FIG. 2 illustrates the flow of a control of a vehicle-mounted fuel cell power generation system in accordance with the embodiment. First, the ECU 10 receives a result of detection by the collision sensor 56, and determines whether the vehicle 1 has collided (S10). The ECU 10 may determine that the vehicle 1 has collided, if occurrence of a considerably great deceleration of the vehicle 1 is recognized on the basis of a received result of detection by the acceleration sensor 52. Incidentally, although the control apparatus of the embodiment is able to detect that the vehicle 1 will collide beforehand, the step S10 is provided assuming a situation where a collision cannot be detected beforehand due to an unexpected factor or the like. For example, in a case where an obstacle cannot be detected before colliding with the vehicle, such as a case where an obstacle falls from above, and collides with the vehicle 1, a case where a vehicle that is not equipped with a rear monitor sensor is hit in the rear by another vehicle, or the like, it is determined in step S10 that the vehicle has collided (YES at S10).

If it is determined in step S10 that the vehicle has not collided (NO at S10), the ECU 10 functions as prediction means for predicting a possibility of collision of the vehicle 1, and determines whether it is possible to avoid collision with the obstacle (S12). For example, the ECU 10 acquires the speed V [m/sec] of the vehicle 1 from a detection result provided by the vehicle speed sensor 50, the distance S [m] to the obstacle from a measurement result provided by the distance measuring sensor 54, and a maximum deceleration DE [m/sec$^2$] of the vehicle 1, and predicts a possibility of the collision of the vehicle 1 on the basis of a predetermined judgment expression ($V^2 \geq 2DE \times S$). If the predetermined judgment expression holds (YES at S12), the ECU 10 determines that the possibility of collision of the vehicle 1 is high. If the predetermined judgment expression does not hold (NO at S12), the ECU 10 determines that the possibility of collision of the vehicle 1 is low, and goes back to step 10. The judgment expression is not limited to the aforementioned expression, but may be an expression in which the relative speed with respect to an obstacle or the like is taken into account. By predicting a possibility of collision and controlling the operation of the fuel cell power generation system before a collision, it becomes possible to enhance the safety of the fuel cell 20 although the fuel cell 20 uses combustible hydrogen for electric power generation.

If determining that the possibility of collision is high (YES at S12), the ECU 10 stops the fuel cell power generation system (S14). The ECU 10 may shut off the supply of hydrogen gas to the fuel cell 20 by controlling the hydrogen supplying portion 24. The shut-off of the supply of hydrogen gas from the hydrogen supplying portion 24 is not immediately followed by stop of the supply of hydrogen to the fuel cell 20, due to the presence of hydrogen in the piping 62. Therefore, the discontinuation of the supply of hydrogen from the hydrogen supplying portion 24 prior to a collision allows reduction in the amount of hydrogen that exists in the piping 62 and the fuel cell 20 when the collision occurs.

Furthermore, the ECU 10 may control the electromagnetic valve 58 to purge the piping 62 forming a gas supplying passage. That is, the ECU 10 opens the electromagnetic valve 58 to release hydrogen from the piping 62 out into the atmosphere. In this case, it is possible to merely open the electromagnetic valve 58, and it is also possible to actively purge hydrogen from the piping 62 through the use of an inert gas or the like while the valve 58 is opened. Due to the release of hydrogen from the piping 62 into the atmosphere, the power generation of the fuel cell 20 can be promptly stopped, and an accident that can result from hydrogen remaining between the fuel cell 20 and the hydrogen supplying portion 24 can be avoided, so that safety can be enhanced.

The ECU 10 may also electrically disconnect the fuel cell 20 from the other electrical system. Specifically, the ECU 10 opens the FC relays 42, 44 to electrically disconnect the fuel cell 20 from the DC/DC converter 26 and the inverter 30. Therefore, it becomes possible to stop the power generation of the fuel cell 20, so that the possibility of occurrence of an accident on the fuel cell 20 due to impact of a collision can be reduced.

As described above, the ECU 10 functions as means for stopping the fuel cell power generation system. It is to be noted herein that although the ECU 10 stops the fuel cell power generation system and breaks the electric connection between the fuel cell 20 and the electric motor 32, the ECU 10 maintains the electric connection of the electric motor 32 with the DC/DC converter 26 and the electricity storage 28 until the vehicle 1 collides. Therefore, during the period until the vehicle 1 collides, the vehicle 1 can acquire drive power from the electricity storage 28, thus leaving the driver a possibility of avoiding the collision and guaranteeing a failsafe operation.

After stopping the fuel cell power generation system, the ECU 10 receives a detection result provided by the collision sensor 56, and determines whether the vehicle 1 has collided (S16). If it is determined that the vehicle 1 has not collided (NO at S16) despite the determination in step S12 that the possibility of a collision is high, the ECU 10 determines whether the vehicle 1 has escaped the collision (S18). If the vehicle speed is "0" (YES at S18), the ECU 10 determines that the driver has avoided the collision by rapidly braking and stopping the vehicle. Then, the ECU 10 promptly returns the hydrogen supplying portion 24, the electromagnetic valve 58, and the FC relays 42, 44 to a normal state assumed during the running of the vehicle, and restarts the fuel cell power generation system (S20).

Furthermore, if a predetermined time has elapsed following the determination of high possibility of collision (YES at S18) although the vehicle speed is not "0", it is determined that the collision has been avoided. Then, the ECU 10 restarts the fuel cell power generation system (S20). It is preferable that the predetermined time be set at a time that is slightly longer than the predicted collision time. By restarting the fuel cell power generation system, a normal vehicle running condition can be resumed.

If it is determined in step S18 that the vehicle speed is not "0" and the predetermined time has not elapsed (NO at S18), the ECU 10 goes back to step S16, in which it is determined whether the vehicle 1 has collided (S16). If the vehicle 1 has collided (YES at S16), the ECU 10 opens the high-voltage relays 46, 48 to break the electric connection between the electricity storage 28 and the electric motor 32 (S22).

If in step S10 the vehicle 1 suddenly collides without prediction of a collision (YES at S10), the ECU 10 executes a process of stopping the fuel cell power generation system, for example, shutting off the gas supply, or releasing gas from the piping, or switching off the FC relays, etc. (S24) as in step S14. Furthermore, the ECU 10 switches off the high-voltage relays (S22), and ends this control.

Incidentally, if the judgment expression in step S12 is rewritten into $V^2/2S \geq DE$, the value of $V^2/2S$ can be considered to be the magnitude of possibility of collision. That is, according to the embodiment, it can be said that if the magnitude of possibility of collision $V^2/2S$ is greater than the maximum deceleration DE, that is, a predetermined value, the fuel cell power generation system is stopped.

The invention has been described above with reference to the embodiment. However, the invention is not limited to the foregoing embodiment, but includes various modifications of the embodiment as effective forms of the invention. For example, in the process of stopping the fuel cell power generation system, although the stopping of supply of hydrogen from the hydrogen supplying portion 24, the release of hydrogen from the piping 62 and the switching off of the FC relays 42, 44 may be simultaneously performed, it is also possible to perform the stop of hydrogen supply from the hydrogen supplying portion 24 and the release of hydrogen from the piping 62 with precedence before the switching off of the FC relays 42, 44, in view of avoidance of an accident caused by hydrogen at the time of collision. Furthermore, if the predetermined judgment expression ($V^2 \geq 2DE \times S$) in S12 holds (YES at S12), it may be determined that the vehicle 1 will collide with the nearest obstacle among obstacles existing forward of the vehicle 1 in the traveling direction thereof. If it is determined that the vehicle 1 will collide with an obstacle, the process that follows is the process of S14 to S22, as in the foregoing embodiment.

According to the foregoing embodiments, it is possible to provide a control technology capable of safely operating the vehicle-mounted fuel cell power generation system.

The invention claimed is:

1. A control apparatus for a vehicle-mounted fuel cell power generation system, comprising:
    prediction means for predicting a possibility of collision of a vehicle;
    stop means for stopping the vehicle-mounted fuel cell power generation system;
    electricity storage means for storing an electric power generated by a fuel cell of the vehicle-mounted fuel cell power generation system;
    a load that consumes an electric power, wherein the load is a motor for driving the vehicle;
    disconnection means for electrically disconnecting the load and the electricity storage means from each other; and
    detection means for detecting a collision of the vehicle,
    wherein the stop means stops the vehicle-mounted fuel cell power generation system if the prediction means determines that the possibility of collision is high,
    wherein an amount of fuel gas in at least one of the fuel cell and a gas supplying passage via which the fuel gas is supplied to the fuel cell is forcibly reduced prior to a collision, and
    wherein if the detection means detects a collision of the vehicle, the disconnection means electrically disconnects the load and the electricity storage means from each other.

2. The control apparatus according to claim 1, wherein if the prediction means determines that the possibility of collision is high, the stop means discontinues supply of a gas to a fuel cell of the vehicle-mounted fuel cell power generation system.

3. The control apparatus according to claim 1, wherein if the prediction means determines that the possibility of collision is high, the stop means purges the gas supplying passage of a fuel cell of the vehicle-mounted fuel cell power generation system.

4. The control apparatus according to claim 1, wherein if the prediction means determines that the possibility of collision is high, the stop means electrically disconnects a fuel cell of the vehicle-mounted fuel cell power generation system from another electrical system.

5. The control apparatus according to claim 1, further comprising start means for staffing the vehicle-mounted fuel cell power generation system,
    wherein if the prediction means determines that the possibility of collision is high and then, within a predetermined time that follows, the detection means does not detect a collision of the vehicle, the staff means restarts the vehicle-mounted fuel cell power generation system.

6. The control apparatus according to claim 1, further comprising start means for starting the vehicle-mounted fuel cell power generation system,
    wherein if the prediction means determines that the possibility of collision is high and then a vehicle speed reaches zero without the detection means detecting the collision of the vehicle, the staff means restarts the vehicle-mounted fuel cell power generation system.

7. The control apparatus according to claim 1, wherein the prediction means predicts the possibility of collision using an acceleration sensor.

8. The control apparatus according to claim 7, wherein the acceleration sensor is also used for a purpose other than prediction of the possibility of collision.

9. The control apparatus according to claim 8, further comprising control means for executing an antilock brake system control as the purpose other than prediction of the possibility of collision.

10. The control apparatus according to claim 1, wherein the prediction means predicts the possibility of collision using a distance measuring sensor.

11. The control apparatus according to claim 1, wherein the prediction means determines a magnitude of the possibility of collision, and
    wherein the stop means stops the vehicle-mounted fuel cell power generation system if the magnitude of the possibility of collision determined by the prediction means is equal to or higher than a predetermined value.

12. The control apparatus according to claim 11, wherein the prediction means determines the magnitude of the possibility of collision based on a vehicle speed of the vehicle.

13. The control apparatus according to claim 12, wherein the prediction means determines the magnitude of the possibility of collision based on a distance to an obstacle.

14. The control apparatus according to claim 13, wherein the prediction means determines the distance to the obstacle using a distance measuring sensor.

15. The control apparatus according to claim 11, wherein the prediction means determines the magnitude of the possibility of collision based on a relative speed of the vehicle with respect to an obstacle.

16. The control apparatus according to claim 11, wherein the prediction means determines the magnitude of the possibility of collision based on a distance to an obstacle.

17. The control apparatus according to claim 1, wherein the vehicle-mounted fuel cell power generation system includes a hydrogen source that supplies hydrogen to a fuel cell of the vehicle-mounted fuel cell power generation system.

18. The control apparatus according to claim 17, wherein the hydrogen source includes a reformer that generates hydrogen.

19. A control apparatus for a vehicle-mounted fuel cell power generation system, comprising:
    determination means for determining whether a vehicle will collide with an external object;
    stop means for stopping the vehicle-mounted fuel cell power generation system;
    electricity storage means for storing an electric power generated by a fuel cell of the vehicle-mounted fuel cell power generation system;
    a load that consumes an electric power, wherein the load is a motor for driving the vehicle;
    disconnection means for electrically disconnecting the load and the electricity storage means from each other; and
    detection means for detecting a collision of the vehicle,
    wherein the stop means stops the vehicle-mounted fuel cell power generation system if the determination means determines that the vehicle will collide with the external object,
    wherein an amount of fuel gas in at least one of the fuel cell and a gas supplying passage via which the fuel gas is supplied to the fuel cell is forcibly reduced prior to a collision, and wherein if the detection means detects a collision of the vehicle, the disconnection means electrically disconnects the load and the electricity storage means from each other.

20. The control apparatus according to claim 19, wherein the determination means determines whether the vehicle will collide with an obstacle present forward of the vehicle in a traveling direction of the vehicle which is the external object.

21. The control apparatus according to claim 19, wherein the determination means determines whether the vehicle will collide with the external object using a distance measuring sensor.

22. A control method for a vehicle-mounted fuel cell power generation system, comprising the steps of:
   storing an electric power generated by a fuel cell of the vehicle-mounted fuel cell power generation system in an electricity storage means;
   providing an electric power to a load, wherein the load is a motor for driving the vehicle;
   determining whether a possibility of collision of a vehicle is high;
   stopping the vehicle-mounted fuel cell power generation system if it is determined that the possibility of collision of the vehicle is high;
   forcibly reducing an amount of fuel gas in at least one of the fuel cell and a gas supplying passage via which the fuel gas is supplied to the fuel cell prior to a collision;
   detecting a collision of the vehicle; and
   if a collision of the vehicle being detected, electrically disconnecting the load and the electricity storage means from each other.

23. The control method according to claim 22, wherein if it is determined that the possibility of collision of the vehicle is high, supply of hydrogen from a hydrogen source to a fuel cell of the vehicle-mounted fuel cell power generation system is stopped, and hydrogen is released from a hydrogen supplying passage of the fuel cell to outside.

24. A control method for a vehicle-mounted fuel cell power generation system, comprising the steps of:
   storing an electric power generated by a fuel cell of the vehicle-mounted fuel cell power generation system in an electricity storage means;
   providing an electric power to a load, wherein the load is a motor for driving a vehicle;
   determining whether the vehicle will collide with an external object;
   stopping the vehicle-mounted fuel cell power generation system if it is determined that the vehicle will collide with the external object;
   forcibly reducing an amount of fuel gas in at least one of the fuel cell and a gas supplying passage via which the fuel gas is supplied to the fuel cell prior to a collision;
   detecting a collision of the vehicle; and
   if a collision of the vehicle being detected, electrically disconnecting the load and the electricity storage means from each other.

25. A control apparatus for a vehicle-mounted fuel cell power generation system, comprising:
   an electricity storage device for storing an electric power generated by a fuel cell of the vehicle-mounted fuel cell power generation system;
   a load that consumes an electric power, wherein the load is a motor for driving the vehicle;
   electronic control logic including:
      first control logic that predicts a possibility of collision of the vehicle;
      second control logic that stops the vehicle-mounted fuel cell power generation system if the first control logic determines that the possibility of collision is high; and
      third control logic for electrically disconnecting the load and the electricity storage device from each other; and
   a sensor for detecting a collision of the vehicle,
   wherein if the sensor detects a collision of the vehicle, the third control logic electrically disconnects the load and the electricity storage device from each other,
   wherein an amount of fuel gas in at least one of the fuel cell and a gas supplying passage via which the fuel gas is supplied to the fuel cell is forcibly reduced prior to a collision.

26. The control apparatus according to claim 25, wherein if the first control logic determines that the possibility of collision is high, the second control logic discontinues supply of a gas to a fuel cell of the vehicle-mounted fuel cell power generation system.

27. The control apparatus according to claim 25, wherein if the first control logic determines that the possibility of collision is high, the second control logic purges the gas supplying passage of a fuel cell of the vehicle-mounted fuel cell power generation system.

28. The control apparatus according to claim 25, wherein if the first control logic determines that the possibility of collision is high, the second control logic electrically disconnects a fuel cell of the vehicle-mounted fuel cell power generation system from another electrical system.

29. The control apparatus according to claim 25, further comprising fourth control logic for starting the vehicle-mounted fuel cell power generation system,
   wherein if the first control logic determines that the possibility of collision is high and then, within a predetermined time that follows, the sensor does not detect a collision of the vehicle, the fourth control logic restarts the vehicle-mounted fuel cell power generation system.

30. The control apparatus according to claim 25, further comprising fourth control logic for starting the vehicle-mounted fuel cell power generation system,
   wherein if the first control logic determines that the possibility of collision is high and then a vehicle speed reaches zero without the sensor detecting the collision of the vehicle, the fourth control logic restarts the vehicle-mounted fuel cell power generation system.

31. The control apparatus according to claim 25, wherein the first control logic predicts the possibility of collision using an acceleration sensor.

32. The control apparatus according to claim 31, wherein the acceleration sensor is also used for a purpose other than prediction of the possibility of collision.

33. The control apparatus according to claim 32, further comprising fifth control logic for executing an antilock brake system control as the purpose other than prediction of the possibility of collision.

34. The control apparatus according to claim 25, wherein the first control logic predicts the possibility of collision using a distance measuring sensor.

35. The control apparatus according to claim 25, wherein the first control logic determines a magnitude of the possibility of collision, and
   wherein the second control logic stops the vehicle-mounted fuel cell power generation system if the magnitude of the possibility of collision determined by the first control logic is equal to or higher than a predetermined value.

36. The control apparatus according to claim 35, wherein the first control logic determines the magnitude of the possibility of collision based on a vehicle speed of the vehicle.

37. The control apparatus according to claim 36, wherein the first control logic determines the magnitude of the possibility of collision based on a distance to an obstacle.

38. The control apparatus according to claim 37, wherein the first control logic determines the distance to the obstacle using a distance measuring sensor.

39. The control apparatus according to claim 35, wherein the first control logic determines the magnitude of the possibility of collision based on a relative speed of the vehicle with respect to an obstacle.

40. The control apparatus according to claim 35, wherein the first logic determines the magnitude of the possibility of collision based on a distance to an obstacle.

41. A control apparatus for a vehicle-mounted fuel cell power generation system, comprising:
   an electricity storage device for storing an electric power generated by a fuel cell of the vehicle-mounted fuel cell power generation system;
   a load that consumes an electric power, wherein the load is a motor for driving a vehicle;
   electronic control logic including:
      first control logic that determines whether the vehicle will collide with an external object;
      second control logic that stops the vehicle mounted fuel cell power generation system if the first control logic determines that the vehicle will collide with the external object; and
      third control logic for electrically disconnecting the load and the electricity storage device from each other; and
   a sensor for detecting a collision of the vehicle,
   wherein if the sensor detects a collision of the vehicle, the third control logic electrically disconnects the load and the electricity storage device from each other,
   wherein an amount of fuel gas in at least one of the fuel cell and a gas supplying passage via which the fuel gas is supplied to the fuel cell is forcibly reduced prior to a collision.

42. The control apparatus according to claim 41, wherein the first control logic determines whether the vehicle will collide with an obstacle present forward of the vehicle in a traveling direction of the vehicle which is the external object.

43. The control apparatus according to claim 41, wherein the first control logic determines whether the vehicle will collide with the external object using a distance measuring sensor.

44. The control apparatus according to claim 41, wherein the vehicle-mounted fuel cell power generation system includes a hydrogen source that supplies hydrogen to a fuel cell of the vehicle-mounted fuel cell power generation system.

45. The control apparatus according to claim 44, wherein the hydrogen source includes a reformer that generates hydrogen.

46. A control apparatus for a vehicle including a fuel cell, comprising:
   an electricity storage device for storing an electric power generated by the fuel cell;
   a load that consumes an electric power, wherein the load is a motor for driving the vehicle;
   electronic control logic including:
      first control logic that predicts a possibility of collision of the vehicle;
      second control logic that outputs the predicted possibility to a control apparatus for the fuel cell; and
      third control logic for electrically disconnecting the load and the electricity storage device from each other; and
   a sensor for detecting a collision of the vehicle,
   wherein if the sensor detects a collision of the vehicle, the third control logic electrically disconnects the load and the electricity storage device from each other,
   wherein an amount of fuel gas in at least one of the fuel cell and a gas supplying passage via which the fuel gas is supplied to the fuel cell is forcibly reduced prior to a collision.

47. A control apparatus for a vehicle including a fuel cell, comprising:
   an electricity storage device for storing an electric power generated by the fuel cell;
   a load that consumes an electric power, wherein the load is a motor for driving the vehicle;
   electronic control logic including:
      first control logic that determines whether the vehicle will collide with an external object;
      second control logic that outputs information regarding a collision to a control apparatus for the fuel cell if the first control logic determines that the vehicle will collide with the external object; and
      third control logic for electrically disconnecting the load and the electricity storage device from each other; and
   a sensor for detecting a collision of the vehicle,
   wherein if the sensor detects a collision of the vehicle, the third control logic electrically disconnects the load and the electricity storage device from each other,
   wherein an amount of fuel gas in at least one of the fuel cell and a gas supplying passage via which the fuel gas is supplied to the fuel cell is forcibly reduced prior to a collision.

* * * * *

UNITED STATES PATENT AND TRADEMARK OFFICE
CERTIFICATE OF CORRECTION

PATENT NO. : 7,690,458 B2 Page 1 of 1
APPLICATION NO. : 10/557576
DATED : April 6, 2010
INVENTOR(S) : Akihiro Ueda It is certified that error appears in the above-identified patent and that said Letters Patent is hereby corrected as shown below:

| Column | Line | |
|--------|------|--|
| 9 | 53 | Change "staffing" to --starting--. |
| 9 | 66 | Change "staff means" to --start means--. |

Signed and Sealed this

Thirty-first Day of August, 2010

David J. Kappos
*Director of the United States Patent and Trademark Office*